(12) United States Patent
Kybelund

(10) Patent No.: US 9,833,954 B2
(45) Date of Patent: Dec. 5, 2017

(54) METHOD FOR MANUFACTURING A COMPOSITE

(71) Applicant: Siemens Aktiengesellschaft, Munich (DE)

(72) Inventor: Peter Kybelund, Egtved (DK)

(73) Assignee: Siemens Aktiengesellschaft, Munich (DE)

( * ) Notice: Subject to any disclaimer, the term of this patent is extended or adjusted under 35 U.S.C. 154(b) by 478 days.

(21) Appl. No.: 14/345,242

(22) PCT Filed: Oct. 15, 2012

(86) PCT No.: PCT/EP2012/070382
§ 371 (c)(1),
(2) Date: May 6, 2014

(87) PCT Pub. No.: WO2013/060588
PCT Pub. Date: May 2, 2013

(65) Prior Publication Data
US 2014/0238590 A1    Aug. 28, 2014

(30) Foreign Application Priority Data
Oct. 27, 2011 (EP) .................... 11186893

(51) Int. Cl.
*B29C 70/30* (2006.01)
*B29C 70/54* (2006.01)

(52) U.S. Cl.
CPC ............ *B29C 70/30* (2013.01); *B29C 70/543* (2013.01); *Y10T 156/10* (2015.01)

(58) Field of Classification Search
CPC ....................................................... B29C 70/30
See application file for complete search history.

(56) References Cited

U.S. PATENT DOCUMENTS

| | | | |
|---|---|---|---|
| 3,340,136 A * | 9/1967 | Burns | C08G 63/54 |
| | | | 524/604 |
| 7,271,202 B2 | 9/2007 | Belot | |
| 2007/0023975 A1* | 2/2007 | Buckley | B29B 11/16 |
| | | | 264/494 |
| 2010/0029155 A1* | 2/2010 | Peterson | B32B 17/04 |
| | | | 442/79 |

* cited by examiner

*Primary Examiner* — Daniel Lee
(74) *Attorney, Agent, or Firm* — Beusse Wolter Sanks & Maire

(57) ABSTRACT

A method for manufacturing a composite using an adhesive for attaching different layers of fiber material in a correct position is provided. The method includes at least partly dissolving the adhesive by wetting the adhesive with a thermoset resin containing components acting as solvents for the adhesive. The adhesive may include a thermoplastic adhesive with functional groups, which can react with a thermoset resin. Preferably, the adhesive can be made from the same base resin as the thermoset resin for optimal compatibility. Moreover, the adhesive can also be used to reduce the permeability of a material, for example of a fiber package for handling using a semi-vacuum.

15 Claims, 1 Drawing Sheet

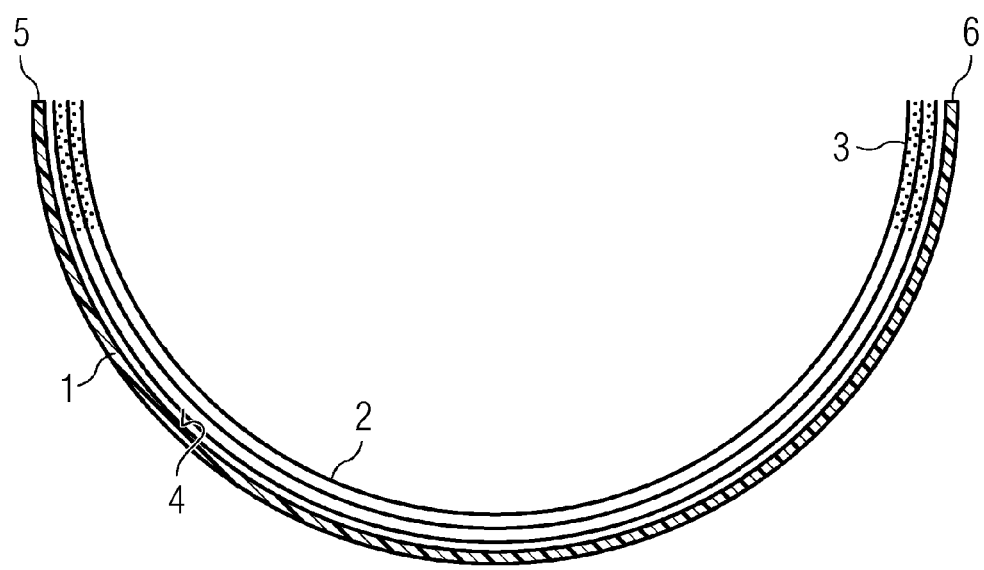

METHOD FOR MANUFACTURING A COMPOSITE

CROSS REFERENCE TO RELATED APPLICATIONS

This application is the US National Stage of International Application No. PCT/EP2012/070382 filed Oct. 15, 2012, and claims the benefit thereof. The International Application claims the benefit of European Application No. EP11186893 filed Oct. 27, 2011. All of the applications are incorporated by reference herein in their entirety.

FIELD OF INVENTION

The present invention relates to a method for manufacturing a composite, for example a wind turbine rotor blade. It further relates to a use of an adhesive for temporarily attaching the reinforcement material. The adhesive can also be used for reducing the permeability of a package of fiber material.

BACKGROUND OF INVENTION

To obtain optimal performance of a composite reinforced with fibers in the form of rovings or fabrics, the lay up of the fibers is essential. Unintentional movement of fibers resulting in wrinkles or displacement of the fibers can have a severe effect on the final laminate properties, and can result in costly repairs or discarding of the laminate.

Especially in large molds, where a large amount of fiber reinforcement is applied in a predefined sequence, the risk of local displacement of fibers is high, unless new layers are continuously fixated. Also, if movement of the mold or inserts into the mold is necessary, the risk of displacement is high.

Currently, to ensure proper placement of mainly fabrics, these are often stitched together for each new layer to form a more stable package of fibers. This is however very labour intensive and in some cases, the stitching of fabrics can be very difficult or impossible to perform, as it requires the fabrics to be lifted at least partly for proper use of the stitching equipment. Furthermore, the stitching negatively affects the fiber structure of the fabrics and thereby induces suboptimal material performance.

Alternatively, a holding device for fabrics can be positioned at the side of the mold, which can then be used to hold each new layer of fabric. This often requires use of excess fabric which should subsequently be cut away and can to some extent also result in a disruption of the fiber structure. This holding method can only be used around the edges of the mold.

The use of adhesives for attaching purposes is limited, as currently available adhesives can interfere with the subsequent wetting of the fibers in the area covered by the adhesive, and will also affect the material properties negatively due to inferior compatibility between adhesive and the thermoset material used to produce the composite part.

The known reactive hot melt adhesives can be used for a variety of purposes and are often based mainly on polyurethanes reacting with moisture in the air, but also adhesives based on ethyl vinyl acetate copolymers. Such adhesives can not be incorporated in a subsequently applied thermosetting resin.

In U.S. Pat. No. 7,271,202 B2 a reactive hot melt composition is disclosed, which has excellent adhesion and curing properties. The composition comprises in ethylene-acrylic acid copolymer, and ethylene-methacrylic acid copolymer, and/or an ethylene-acrylic acid methacrylic acid terpolymer along with free radical cross linking initiators.

An adhesive tape which can be used to adhere fiber fabrics to a mold or other fiber fabrics is produced by Saertex and commercially available under the trade name Saerfix. This tape can also be pre-applied to the fabric from the manufacturer. As in the disclosed invention, this tape is also incorporated into the thermosetting resin matrix during fiber wet out without negative effects on the mechanical properties.

Such tapes do however suffer from some limitations. The geometry of the adhesion surface is limited to simple geometries, which must be cut to shape. As the tapes have adhesive surfaces, until use, the surface must be covered by a carrier material, which must be removed before application and discarded. The shelf life is somewhat limited. Such tapes are relatively expensive. Automated lay-up of such tapes will be rather difficult.

In US 2010/0029155 A1 adhesive coated fabrics are disclosed, which are suitable for use in composite materials. The adhesive coated fabrics are coated on at least one outwards facing surface with an acrylate adhesive. In US 2007/0023975 A1 methods of making fiber reinforced molded articles and fiber mats using anaerobic binders are described.

SUMMARY OF INVENTION

It is a first objective of the present invention to provide an improved method for manufacturing a composite, which reduces the occurrence of wrinkles or a displacement of the used fiber layers. It is a second objective of the present invention to provide a method to obtain a pressure difference in a permeable material.

The first objective is solved by a method for manufacturing a composite as claimed in the independent claim. The second objective is solved by a method to obtain a pressure difference in a permeable material as claimed in a dependent claim. The depending claims define further developments of the present invention.

An embodiment of the inventive method for manufacturing the composite comprises the step of attaching at least one layer of fiber material by means of an adhesive with functional groups, which can react with a thermoset resin. The embodiment further comprises the step of at least partly dissolving the adhesive during wetting the adhesive with a thermoset resin containing components acting as solvents for the adhesive. For example, the adhesive can be wholly dissolved during wetting the adhesive with a thermoset resin containing components acting as solvents for the adhesive.

The composite may for example be a wind turbine rotor blade. Using an adhesive with functional groups, which can react with a thermoset resin, has the advantage, that the used adhesive can subsequently be incorporated into the resulting laminate without affecting the laminate properties negatively.

The at least one layer of fiber material can be fixated to a surface of a mold or to other layers, for example to other layers of fiber material. By using an adhesive, as previously described, for attaching layers of fiber material during the process of manufacturing a composite, an unintentional movement of fibers possibly resulting in wrinkles or displacement of the fibers can be avoided. This increases the quality and the properties of the final laminate or composite. Moreover, costly repairs or discarding of the laminate can be avoided.

Preferably a thermoplastic and/or thermoset adhesive can be used. For example, an adhesive comprising an unsaturated base resin can be used. Advantageously, the adhesive can comprise a base resin of oligomers containing unsaturated bonds. For example, an adhesive comprising an unsaturated polyester and/or vinylester, for instance Bisphenol A based vinylester, can be used.

Commercial adhesives are typically based on either thermoplastic or thermoset materials. Thermoplastic adhesives are usually heated above the melting point and applied to the materials to be bonded, which are then put together. The adhesion can then be obtained by solidification of the thermoplastic. This is a relatively fast process and can be performed with simple equipment. However, when used in the production of reinforced laminates with thermosetting resins, the known thermoplastic materials will only to a small extent be compatible with the resin used to wet the laminate or used to infuse into the laminate, resulting in inferior mechanical properties. A subsequent wetting of the fibers with a thermoset material may also be negatively affected by the thermoplastic material which may act as a coating on the fibers.

Thermoset adhesives are typically composed of two components or more which are mixed shortly before application. With time and, in some cases, elevated temperatures, a chemical reaction may take place and a solid structure can be formed. The formed structure is often very rigid, and may, if used as adhesive for holding fabrics, form a substructure which may negatively affect the overall laminate properties. Such adhesives also often require longer working time. Thermoset adhesives are often based on epoxy or polyurethane.

In general, the unsaturated polyester and the vinylester resins, as can be used in the context of the inventive method embodiments herein, can be made by reacting unsaturated acids together with glycols to form a base resin of oligomers containing unsaturated bonds. Oligomers are short chained polymers. After the desired reaction has taken place, the still hot base resin can be diluted in styrene in order to obtain the required thermoset resin properties. If the base resin is not diluted, it is often a solid with thermoplastic like properties, e.g. it can be melted, but it still contains the reactive chemical groups or unsaturated bonds needed to obtain a thermoset through a subsequent free radical cure reaction.

As the base resin can be melted and re-solidified depending on temperature, it can be used as a thermoplastic adhesive as previously described. This can be advantageous, as the use of such an adhesive in combination with a styrene based thermoset resin makes an ideal compatibility between the adhesive and the thermoset resin possible.

Preferably, the adhesive can be dissolved by styrene during wetting the adhesive with a thermoset resin containing styrene. During wetting with the styrene containing thermoset resin, the adhesive is dissolved by styrene, and, due to the reactive groups in the adhesive, the adhesive is integrated into the thermoset laminate during the cure reaction without compromising the laminate properties.

Generally, the adhesive can be melted and sprayed or otherwise applied to the layer of fiber material. The subsequent layer of fiber material can then be positioned before the adhesive re-solidifies. Alternatively, the adhesive can be present on the substrate in solid form, by previous application in either melted or solid form, and melted shortly before lay up of the subsequent reinforcement layer.

Generally, a vacuum assisted resin transfer molding (VARTM) can be applied to manufacture the composite. Preferably, an adhesive comprising the same or a chemically similar base resin can be used as the resin which is used to manufacture the composite. This provides for an incorporation of the adhesive into the resulting laminate without affecting the laminate properties negatively. The adhesive can be dissolved by styrene during wetting the adhesive with a thermoset resin containing styrene. Moreover, the same or similar oligomers in the adhesive and in the resin can be used. By using the same or similar oligomers in the adhesive and in the resin, compatibility between the two materials is ensured.

The present invention is not limited to VARTM but may also include other composite manufacturing methods.

Chemically similar base resins have the same chemical properties. This means that they can form a homogenous mixture and are able to react together during the curing reaction.

The properties of the base resin can be adjusted to meet process and material requirements by adding different other components in smaller amounts. These additives can include, but are not limited to, reaction inhibitors, reaction catalysts, softeners and other polymeric compositions than the base resin. For example, an adhesive can be used which comprises a base resin to which at least one other component was added. Advantageously, an adhesive can be used which comprises a base resin to which at least one reaction inhibitor and/or at least one reaction catalyst and/or at least one softener and/or at least one other polymeric composition than the base resin was added.

Furthermore, the permeability of the layers of fiber materials can be reduced by means of the adhesive. This means that the application of the previously described adhesive can be made to limit the permeability of the fiber package comprising a number of layers of fiber material. This can further be used to produce a semi-vacuum on one side of an area of the applied adhesive by removal of air faster than it can be replenished through the layers of the fiber material. Generally, the adhesive which may be used for reducing the permeability of the layers of fiber material can have the same properties as the previously described adhesive, which can be used for attaching the layers of fiber material.

Embodiments of the inventive method to obtain a pressure difference in a permeable material comprises the steps of partly sealing the permeable material by means of an adhesive and removing air faster at one side of an area of the permeable material than it can be replenished through the permeable material due to the partly sealing by means of the adhesive. The permeable material can comprise a number of layers of fiber material or a package of fiber material, as it can be used for manufacturing a composite, as previously described. Furthermore, the adhesive may have the same properties as the previously described adhesive in conjunction with the inventive method for manufacturing a composite.

Embodiments of the inventive method for manufacturing a composite uses an adhesive for attaching different layers of fiber material in correct position. The adhesive can be a thermoplastic adhesive with functional groups, which can react with a thermoset resin. Preferably, the adhesive can be made from the same base resin as the thermoset resin for optimal compatibility. Moreover, the adhesive can also be used to reduce the permeability of a material, for example of a fiber package, e.g. for handling using a semi-vacuum.

The aspects defined above and further aspects of the present invention are apparent from the example of an embodiment of the invention to be described hereinafter and are explained with reference to the example of the embodiment. The invention will be described in more detail hereinafter with reference to an example of embodiment but to which the invention is not limited.

Further features, properties and advantages of the present invention will become clear from the following description of an embodiment in conjunction with the accompanying drawings. All features are advantageous separate or in combination with each other.

BRIEF DESCRIPTION OF THE DRAWINGS

FIG. 1 schematically shows a mold for manufacturing a composite in a sectional view.

DETAILED DESCRIPTION OF INVENTION

An embodiment of the present invention will now be described with reference to FIG. 1.

At first, a method for manufacturing a wind turbine rotor blade by vacuum assistant resin transfer molding (VARTM) will shortly be described. It comprises the following steps: A number of layers are placed in a first mold part. Then a number of core parts and at least one shear web are placed in the first mold part. Then, a number of layers of fiber material are placed onto the core parts and the shear web. A second mold part can then be placed onto the core parts and the fiber material such that the first mold shell and the second mold shell are connected to each other forming a closed cavity. To inject resin into the closed mold cavity, vacuum is applied to the closed mold cavity and resin is sucked into the space between the mold shells and the core parts. After letting the resin set the mold shells and the core parts can be removed.

FIG. 1 schematically shows a mold 1 in a sectional view. A number of layers of fiber fabric or fiber material 2 are positioned onto each other at the inner surface 4 of the mold 1. During laying the different layers 2 onto each other, the layers 2 are adhered to one another for fixation. For adhering the layers to each other an adhesive is used.

The mold 1 comprises two edges 5 and 6. The adhesive is applied to the layers 2 at an area 3 which is located close to the edges 5 or 6.

The used adhesive is a thermoplastic adhesive with functional groups, which can react with a thermoset resin. The adhesive is based on either an unsaturated polyester or vinylester, for example a Bisphenol A based vinylester. The used adhesive is melted and sprayed onto the surface of the fiber layer 2 or onto the inner surface 4 of the mold 1, followed by application of the fiber layer before the adhesive re-solidifies. The solidification of the melted adhesive bonds the fiber layer to the surface. Open time can to some extent be controlled by application of temperature in relation to the melting temperature. The adhesive effect is only temporary, as the adhesive is partly or wholly dissolved during the injection of resin, and the adhesive effect is cancelled out.

The adhesive is wetted, for example in a process of vacuum assisted resin transfer molding (VARTM), with a thermoset resin containing components acting as solvents for the adhesive. Thereby the adhesive is partly or wholly dissolved.

The used base resin may not be diluted in styrene and has thermoplastic like properties, which means, that it can be melted, but it still contains the reactive chemical groups (unsaturated bonds) needed to obtain a thermoset through a subsequent free radical cure reaction. The thermoplastic adhesive is combined with a styrene based thermoset resin. The thermoplastic adhesive is wetted with a styrene containing thermoset resin. During wetting with the styrene containing thermoset resin, the adhesive is dissolved by styrene, and, due to the reactive groups in the adhesive, it is integrated into the thermoset laminate during the cure reaction without compromising the laminate properties. By using the same or similar oligomers in the adhesive as in the resin, compatibility between the two materials is ensured.

Vacuum assisted resin transfer molding can be applied. By means of the used adhesive, the permeability of the fiber package 2 is reduced. This can be used to obtain a semi-vacuum on one side of the area of the applied adhesive by removal of air faster than it can be replenished through the fiber package 2.

The properties of the base resin can be adjusted to meet process and material requirements by adding different other components in smaller amounts. These additives can include, but are not limited to, reaction inhibitors, reaction catalysts, softeners and polymeric compositions other than the base resin.

The invention claimed is:

1. A method for manufacturing a composite, comprising attaching at least one layer of fiber material to a substrate by selectively applying an adhesive in a melted state to an edge of the at least one layer of fiber material and not applying the adhesive to a remainder of the at least one layer of fiber material, wherein the adhesive comprises functional groups which can react with a thermoset resin,
cooling the adhesive until the adhesive solidifies,
wetting the adhesive with the thermoset resin after the adhesive has solidified, and
at least partly dissolving the adhesive during wetting of the adhesive with the thermoset resin, wherein the thermoset resin contains components acting as solvents for the adhesive,
solidifying the thermoset resin and dissolved adhesive via a cure reaction between the functional groups and the thermoset resin.

2. The method as claimed in claim 1, wherein the composite comprises a wind turbine rotor blade.

3. The method as claimed in claim 1, wherein the substrate comprises a mold or another layer of fiber material.

4. The method as claimed in claim 1, wherein the adhesive comprises an unsaturated base resin.

5. The method as claimed in claim 1, wherein the adhesive comprises a base resin of oligomers containing unsaturated bonds.

6. The method as claimed in claim 1, wherein the adhesive comprises polyester and/or vinylester.

7. The method as claimed in claim 1, further comprising melting the adhesive prior to attaching the at least one layer of fiber material to the substrate with the adhesive.

8. The method as claimed in claim 1, further comprising applying vacuum assisted resin transfer molding to manufacture the composite.

9. The method as claimed in claim 8, wherein the adhesive comprises the same or a chemically similar base resin as the thermoset resin which is used to manufacture the composite.

10. The method as claimed in claim 1, wherein the thermoset resin comprises styrene, and wherein the dissolving comprises dissolving the adhesive by the styrene during wetting the adhesive with the thermoset resin.

11. The method as claimed in claim 1, wherein the same or similar oligomers are used in the adhesive and in the thermoset resin.

12. The method as claimed in claim 1, wherein the adhesive comprises a base resin to which at least one other component is added.

13. The method as claimed in claim 12, wherein the adhesive comprises the base resin to which at least one reaction inhibitor and/or reaction catalyst and/or softener and/or other polymeric composition than the base resin is added.

14. The method as claimed in claim 1, further comprising reducing the permeability of the at least one layer of fiber material by the adhesive.

15. The method as claimed in claim 1, wherein the adhesive comprises styrene, wherein the thermoset resin comprises styrene, wherein during the cooling an amount of styrene in the adhesive is insufficient to obtain the cure reaction, and wherein the dissolved adhesive and the thermoset resin together comprise sufficient styrene to obtain the cure reaction.

* * * * *